Dec. 19, 1967    W. E. LAUN    3,358,789
PORTABLE TREE STAND
Filed Oct. 7, 1966    2 Sheets-Sheet 2
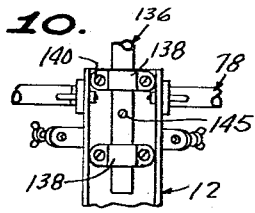
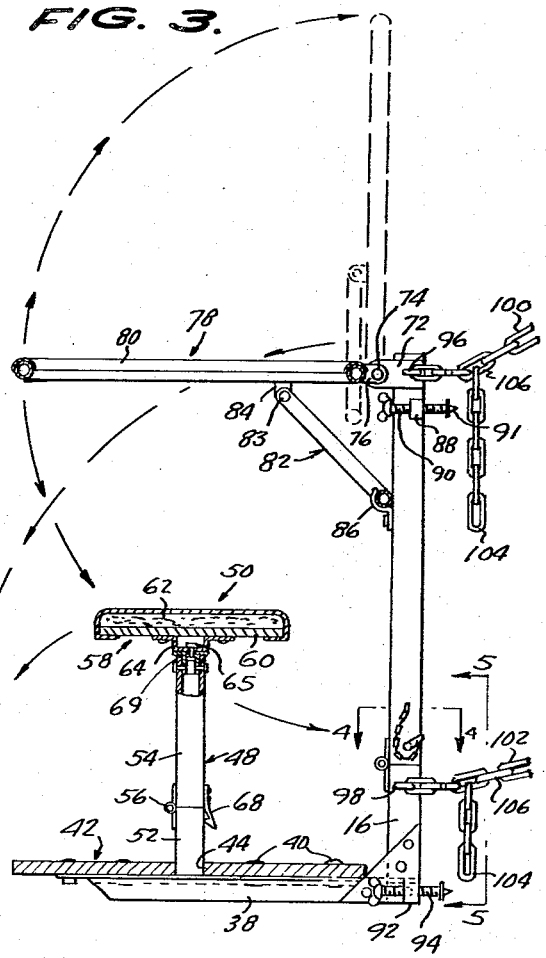
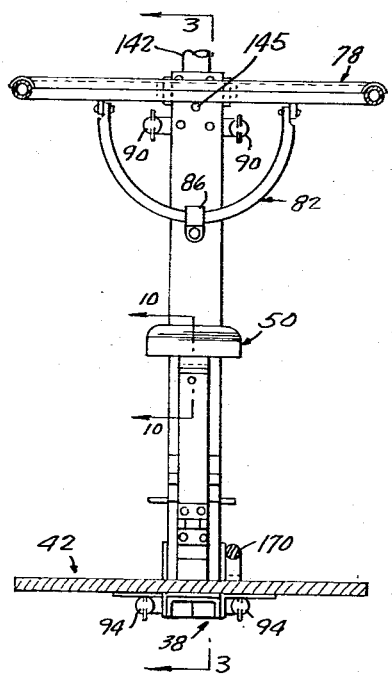
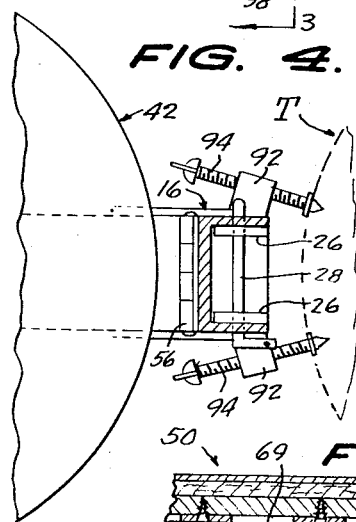
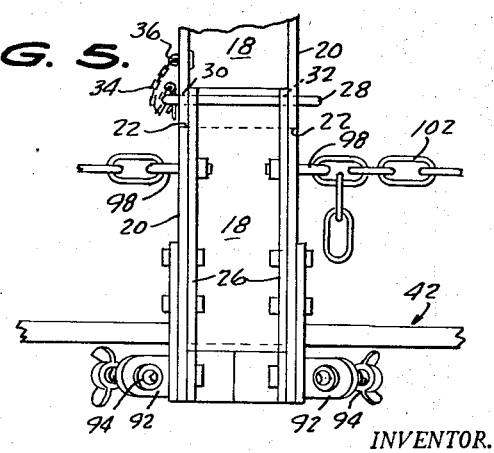
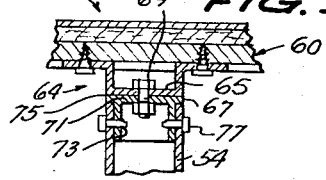
INVENTOR.
WALTER E. LAUN,
BY
Berman, Davidson & Berman
ATTORNEYS.

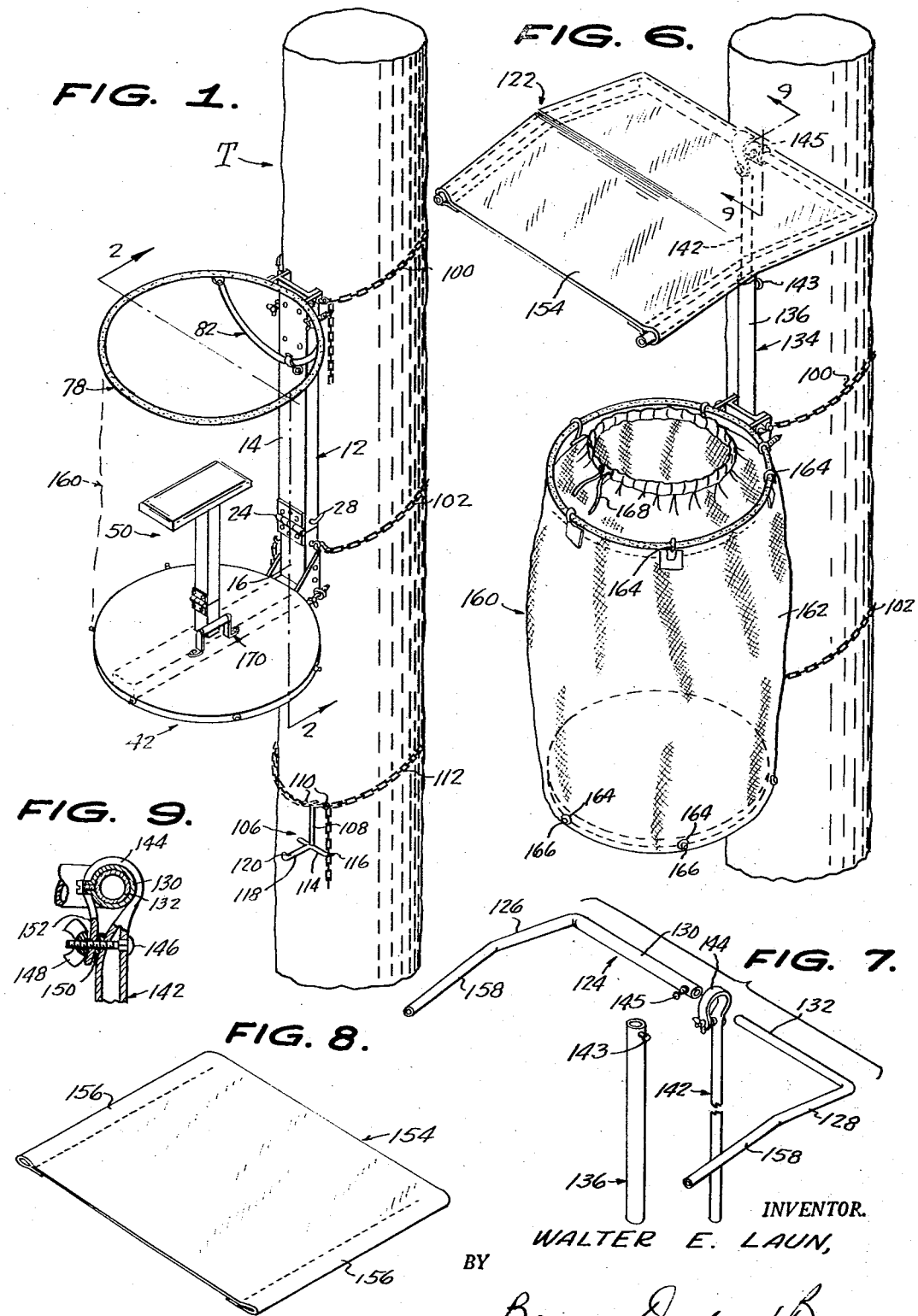

United States Patent Office 3,358,789
Patented Dec. 19, 1967

3,358,789
PORTABLE TREE STAND
Walter E. Laun, 9162 Simmons Blvd.,
Shreveport, La. 71108
Filed Oct. 7, 1966, Ser. No. 585,195
10 Claims. (Cl. 182—113)

This invention relates to a portable tree stand, especially but not exclusively, for hunters.

The primary object of the invention is the provision of a practical, efficient, and easily used device of the kind indicated, which is lightweight and collapsible into a small flat bulk for carrying and storage, and which, with the aid of step components of the device, adapted to be installed on a tree trunk, is easily and quickly installed on a tree trunk, at a suitable distance above the ground, so as to give the hunter a clear and unobstructed view, above the brush.

Another object of the invention is the provision of a simple device of the character indicated above, wherein all of its components, with the exception of the steps and optional foul weather components, are connected together, so that risk of the device coming apart, or of loss of components, while working through dense brush, is eliminated.

A further object of the invention is the provision, in a device of the character indicated above, of a top designed to protect the hunter and his gun from rain, snow, or sun while occupying the device, the top being readily folded out of the way, when its use in not wanted, and to facilitate entrance into the device.

A still further object of the invention is the provision, in a device of the character indicated above, of a foldaway seat, arranged so that the hunter is free to use the seat or to stand with his legs at opposite sides of the seat.

In the drawings:

FIGURE 1 is a schematic perspective view, showing a device of the invention installed on a tree trunk together with steps;

FIGURE 2 is a vertical sectional, taken on the line 2—2 of FIGURE 1;

FIGURE 3 is a vertical section, taken on the line 3—3 of FIGURE 2;

FIGURE 4 is an enlarged fragmentary horizontal section, taken on the line 4—4 of FIGURE 3;

FIGURE 5 is an enlarged fragmentary rear elevation, taken from the line 5—5 of FIGURE 3;

FIGURE 6 is a view, like FIGURE 2, showing the incorporation in the device of a cover, and a body shield;

FIGURE 7 is an exploded perspective view of associated support members of the cover;

FIGURE 8 is a perspective view of the cover sheet;

FIGURE 9 is in enlarged fragmentary vertical section, taken on the line 9—9 of FIGURE 6;

FIGURE 10 is a fragmentary rear elevation, showing the clamps for the top structure; and FIGURE 11 is an enlarged fragmentary vertical section, taken through the swivel mount of the seat.

Referring in detail to the drawings, and first to FIGURES 1 through 5, the illustrated device is adapted to be installed on a tree trunk T, at a desired distance above the ground. The device comprises a vertically elongated, rearwardly opening channel upright 12, which is composed of a relatively long upper section 14, and a relatively short lower section 16. These sections have forward webs 18, and side flanges 20, and squared meeting ends 22. These sections are secured together, and the sections foldable relative to each other, by means of a hinge 24, whose leaves are suitably fixed to the forward sides of the webs 18. As shown in FIGURE 5, reinforcing strips 26 are suitably secured to the inner surfaces of the side flanges 20, of the lower section 16, and to the rear surface of the web 18 of the lower section, and extend up into the upper section. The sections are maintained in vertically aligned erect relationship by means of a pin 28 removably extended through aligned holes 30, 32, in the side flanges 20 of the upper section 14, and the reinforcing strips 26, of the lower section. A chain 34 secured to the pin 28 and to an eye 36, on the upper section, assures against loss of the pin.

A right-angled, normally horizontal inverted channel arm 38 is suitably fixed to and extends forwardly from the lower end of the lower section 16, of the upright 12, upon which is bolted, as indicated at 40, a circular floor or platform 42, of such as plywood. A central opening 44 is provided in the floor.

Located in the opening 44 of the floor, is the tubular sectional standard 48, of a seat assembly 50. The standard 48 consists of a relatively short lower section 52, welded onto the arm 38, and a relatively long upper section 54, adapted to abut the upper end of the lower section, in the erected position of the upper section. A hinge 56, secured to the front sides of the sections 52 and 54, provides for forward and downward folding of the upper section 54, as indicated in FIGURE 3.

A seat 58 comprises a rectangular, forwardly and rearwardly elongated board 60, upon which a covered foam rubber pad 62 is secured. A U-shaped bracket 64, fixed to the underside of the board 60, and has a cross member 65 formed with a central opening 67, through which a vertical pivot bolt 69 extends. The cross member 65 rests upon the top wall 71, of a socket 73 which is telescoped into the upper end of the standard section 54, which has a lateral flange 75 bearing upon the top of the section 54. Opposed screws 77 extend through opposed walls of the socket and the section, to hold the socket in place. The seat 58 is shaped and disposed, as described, so that the hunter can comfortably stand on the floor, when desired, with his legs at opposite sides of the seat, and so that the seat will turn freely as the hunter changes position. The standard 48 has a releasable spring latch 68 for holding its sections in their erect and aligned relationship.

Ears 72, affixed to the outer sides of the side flanges of the upper section of the upright 12, extend forwardly therefrom, and are traversed by bolts 74, which extend through rearwardly extending ears 76, on a guard ring 78, of substantially the same diameter as the floor 42. The ring 78 is spaced above the seat assembly 50, at about the same distance that the seat 58 is spaced above the floor 42. The ring 78 preferably has a non-metallic cover 80 around its top and inner side. The ring 78 is normally held up in a horizontal position, by means of a semicircular brace 82, pivoted at its free ends, as indicated at 83, to pendant ears 84, on the underside of the ring 78, the middle portion of the brace being adapted to be forcibly engaged behind and in a spring clip 86, mounted on the web of the upper section of the upright 12.

Spaced below and near to the ears 76 are lateral lugs 88, which are angled rearwardly and lateral inwardly toward each other. Tree trunk engaging thumb screws 90 are threaded through the lugs 88, and are in rearwardly convergent relationship, so that their pointed terminals 91 can securely and supportably engage tree trunks of different diameters.

Lugs 92, similar to the lugs 88, and equipped with pointed thumb screws 94, are on the outer sides of the lower upright section 16, adjacent to the lower end thereof.

Upper lateral hooks 96 and lower lateral hooks 98 extend from the side flanges of the upright sections. The upper hooks 96 are located on the ears 76, and the lower hooks 98 are located on the side flanges of the lower upright section 16, below the upper end of the lower section.

Similar upper and lower tree trunk embracing chains 100 and 102, respectively, have one end thereof permanently engaged on one of each pair of upper and lower hooks, and have free ends 104. Links 106 of the chains are adapted to be engaged over the other hooks of the pairs, in accordance with the diameter of the tree trunk involved in a particular installation.

Before installation of the device is undertaken, one or more steps 106 are applied to the tree trunk, as shown in FIGURE 1. Suitable steps 106 can comprise standards 108, adapted to bear against the tree trunk, having lateral hooks 110, at their upper ends, with which tree trunk embracing chains 112 are adapted to be adjustably engaged. On the lower ends of the standards 108 are lateral arms 114, terminating in rearwardly extending trunk engaging points 116, and a forwardly extending horizontal step arm 118, having an upturned forward or outer end 120.

Having placed steps 106 to the desired height on the tree trunk, the installer of the device climbs the tree trunk, using the steps, and carries a small rope secured to the device, which has been set up on the ground, and applies the upper chain 100 to the trunk, and tightens the same by means of the upper thumb screw 90. The lower chain 102 is then similarly applied and tightened to the tree trunk, and the device made ready for use. The taking down of the device is simply a reversal of this procedure. As shown in phantom lines in FIGURE 3, the ring 78, is adapted to be swung up against the tree trunk, when desired, to provide freedom of access and egress from the device.

Optional foul weather gear can comprise a cover assembly 122, adapted to shield the head and shoulders of the occupant of the device. The cover assembly 122, as shown in FIGURES 7, 8, 9 and 10, comprises a U-shaped, generally horizontal frame 124, composed of two L-shaped sections 126, 128. The transverse arm 130 of the section 126 is larger in diameter to slidably accept the arm 132 of the section 128. A post 134 comprises a tubular lower section 136, engaged with the rear side of the web of the upper section of the upright 12, in straps 138, held in place by means of screws 140; and an upper section 142, telescoped into the lower section, and held in place therein by means of a set screw 143. A set screw 145 threaded through the web of the lower section 136, holds the upper section 142 in adjusted positions, such as when the hunter is standing or sitting. The upper post section 142 has a flattened upper end portion which is formed into a forwardly and downwardly curved clamp 144 which is traversed by a bolt 146, having a wing nut 148 for tightening the clamp 144, around the arm 130 of the cover frame section 126, as shown in FIGURE 9, with a compressible rubber washer 150, on the bolt and interposed between the terminal end 152, of the clamp and the post section 142. Adjusting the clamp 144, by means of the wing nut 148, permits of locking the cover frame 124 in different angles, relative to the horizontal. A flexible waterproof cover 154 comprises a rectangular sheet of suitable material, having tubes 156 of the material along its sides, which are slipped onto the forwardly extending bars 158 of the frame 124. By loosening the set screw 143, the top 122 is adapted to be adjusted in height, to accommodate the hunter in sitting and standing positions. A set screw 145 is provided, on the arm 13, for locking the arm 130 therein.

Where more protection for the occupant of the device, and his equipment, such as a gun resting upon the floor 42 and leaning against the ring 78, a tubular shield assembly 160 is adapted to be installed on the device, as shown in FIGURE 6.

The shield assembly 160 comprises a vertical tube 162 of suitable flexible material, extending between the floor 42 and the ring 78, and having circumferentially spaced, out-turned hooks 164 therearound, adjacent to its upper end, which engage outwardly over the ring 78. At its lower end, the tube 162 is provided with circumferentially spaced eyelets 164, adapted to be releasably engaged over suitable fasteners 166, on the edge of the floor 42. The upper end of the tube 162 can be provided with a drawstring 168, by means of which the upper end of the tube may be constricted around the body of the occupant of the device. A carrying handle 170, on the top of the floor 42, facilitates carrying the device in collapsed condition.

What is claimed is:

1. A device of the character described, comprising an upright, a horizontal lateral arm on the lower end of the upright, a floor secured upon said arm, a normally horizontal guard ring pivoted on the upright at its upper end, a brace pivoted to said ring, a clip on the upright spaced below the pivotal point of the guard ring, said brace being adapted to be releasably engaged with said clip, and upper and lower tree trunk embracing means connected to said upright at locations spaced therealong.

2. A device according to claim 1, wherein said embracing means comprises upper and lower chains, means for adjusting the effective lengths of the chains, and means for tightening the chains around a tree trunk.

3. A device according to claim 1, wherein said embracing means comprises upper and lower chains, means for adjusting the effective lengths of the chains, and means for tightening the chains around a tree trunk, said adjusting means comprising hooks on the sides of the upright, said chains having links secured at one end to a hook, and free ends adapted to be selectively engaged over other hooks.

4. A device according to claim 1, wherein said embracing means comprises upper and lower chains, means for adjusting the effective lengths of the chains, and means for tightening the chains around a tree trunk, said tightening means comprising pairs of tree trunk engaging screws threadably mounted on opposite sides of the upright, said screws being in convergent relationship in a direction away from the guard ring and the floor.

5. A device according to claim 1, wherein a cover assembly comprises a vertically adjustable post mounted on and extending above said upright, a U-shaped generally horizontal frame having a cross member and legs, clamp means on the upper end of said post embracing said cross member, and a cover having tubes along its sides engaged over the frame legs.

6. A device according to claim 1, wherein a tubular shield extends between the floor and the guard ring and extends above the guard ring, said shield having out-turned hooks adjacent to and spaced from its upper end, said hooks being engaged over the guard ring, and circumferentially spaced fastener means composed of first elements on the lower end of the shield and second elements on the periphery of the floor, said first and second elements being separably engaged with each other.

7. A device according to claim 1, wherein a tubular shield extends between the floor and the guard ring and extends above the guard ring, said shield having out-turned hooks adjacent to and spaced from its upper end, said hooks being engaged over the guard ring, and circumferentially spaced fastener means composed of first elements on the lower end of the shield and second elements on the periphery of the floor, said first and second elements being separably engaged with each other, said shield having a drawstring around its upper end.

8. A device according to claim 1, wherein said upright comprises a lower section fixed to said horizontal arm, and an upper section hinged on the lower section, said sections being channel forms having webs and side flanges, said lower section having reinforcing means extending into the upper section along the inner sides of the side flanges of the upper section, said reinforcing means and the side flanges of the upper section being formed with aligned holes, and a pin removably engaged through said holes.

9. A device according to claim 1, wherein a seat assembly comprises a standard fixed to and rising from said horizontal arm at the center of the floor, and a seat rotatably mounted on the upper end of the standard.

10. A device according to claim 1, wherein a seat assembly comprises a standard fixed to and rising from said horizontal arm at the center of the floor, and a seat mounted on the upper end of the standard, said standard comprising a fixed lower section and an upper section hinged on the lower section, and latch means adapted to hold the upper section erect upon and in vertical alignment with the lower section.

References Cited

UNITED STATES PATENTS

| | | | |
|---|---|---|---|
| 2,963,108 | 12/1960 | Smith | 182—129 |
| 2,982,337 | 5/1961 | Arena | 182—187 |
| 3,030,160 | 5/1962 | Tandy | 182—187 |
| 3,116,808 | 1/1964 | Riley | 182—129 |
| 3,232,664 | 2/1966 | McBride | 182—187 |

REINALDO P. MACHADO, *Primary Examiner.*